(12) United States Patent
Wang et al.

(10) Patent No.: US 8,469,141 B2
(45) Date of Patent: Jun. 25, 2013

(54) ACOUSTIC DAMPING DEVICE FOR USE IN GAS TURBINE ENGINE

(75) Inventors: Shanwu Wang, Cincinnati, OH (US); Fei Han, Niskayuna, NY (US); Mark Anthony Mueller, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/207,074

(22) Filed: Aug. 10, 2011

(65) Prior Publication Data
US 2013/0037345 A1    Feb. 14, 2013

(51) Int. Cl.
*F02K 1/00*    (2006.01)

(52) U.S. Cl.
USPC ............. 181/213; 181/212; 244/1 N; 415/119

(58) Field of Classification Search
USPC .................... 181/213, 212; 244/1 N; 415/119
See application file for complete search history.

(56) References Cited

U.S. PATENT DOCUMENTS

| | | | |
|---|---|---|---|
| 3,819,009 A * | 6/1974 | Motsinger ..................... | 181/292 |
| 5,373,695 A | 12/1994 | Aigner et al. | |
| 5,644,918 A | 7/1997 | Gulati et al. | |
| 6,634,457 B2 | 10/2003 | Paschereit et al. | |
| 6,964,170 B2 * | 11/2005 | Alkabie .......................... | 60/772 |
| 6,981,358 B2 * | 1/2006 | Bellucci et al. .............. | 60/39.17 |
| 7,076,956 B2 | 7/2006 | Young et al. | |
| 7,311,175 B2 * | 12/2007 | Proscia et al. ................ | 181/290 |
| 7,320,222 B2 | 1/2008 | Flohr et al. | |
| 7,334,408 B2 | 2/2008 | Bethke et al. | |
| 7,337,875 B2 * | 3/2008 | Proscia et al. ................ | 181/214 |
| 7,461,719 B2 * | 12/2008 | Tobik et al. .................... | 181/213 |
| 7,549,506 B2 * | 6/2009 | Sattinger ........................ | 181/213 |
| 7,578,369 B2 * | 8/2009 | Francisco et al. ............. | 181/213 |
| 7,661,267 B2 | 2/2010 | Pollarolo | |
| 8,037,967 B2 * | 10/2011 | Mercat ........................... | 181/292 |
| 2005/0034918 A1 * | 2/2005 | Bland et al. ................... | 181/250 |
| 2007/0125089 A1 | 6/2007 | Sattinger | |
| 2008/0041058 A1 * | 2/2008 | Johnson et al. ................. | 60/725 |
| 2008/0087018 A1 | 4/2008 | Woolenweber | |

FOREIGN PATENT DOCUMENTS

| | | |
|---|---|---|
| EP | 1666795 B1 | 4/2010 |
| WO | 2010018069 A1 | 2/2010 |

OTHER PUBLICATIONS

EP Search Report and Opinion dated Jan. 2, 2013 from corresponding EP Application No. 12179748.4.

* cited by examiner

*Primary Examiner* — Forrest M Phillips
(74) *Attorney, Agent, or Firm* — General Electric Company; David J. Clement; William J. Zychlewicz

(57) ABSTRACT

An acoustic dampener comprises a first wall, orifice plate, and second wall. The first wall separates a first fluid source from a second fluid source. The first wall has a hole for allowing fluid communication between the first fluid source and a first cavity of the acoustic dampener. The office plate separates the first cavity of the acoustic dampener from a second cavity of the acoustic dampener. The second wall has a hole for allowing fluid communication between the first cavity of the acoustic dampener in the second cavity of the acoustic dampener. The second wall separates the second cavity of the acoustic dampener from the second fluid source. The second wall has a hole for allowing fluid communication between the second cavity of the acoustic dampener and the second fluid source. In one embodiment, the acoustic dampener is formed in a combustion chamber liner of a gas turbine engine.

20 Claims, 4 Drawing Sheets

ACOUSTIC DAMPING DEVICE FOR USE IN GAS TURBINE ENGINE

BACKGROUND OF THE INVENTION

This application relates generally to combustors and, more particularly, to an acoustic damper in a combustion liner of the combustor of a gas turbine engine.

Air pollution concerns worldwide have led to stricter emissions standards both domestically and internationally. Pollutant emissions from industrial aero engines are subject to Environmental Protection Agency (EPA) standards that regulate the emission of oxides of nitrogen (NOx), unburned hydrocarbons (HC), and carbon monoxide (CO). In general, engine emissions fall into two classes: those formed because of high flame temperatures (NOx), and those formed because of low flame temperatures that do not allow the fuel-air reaction to proceed to completion (HC & CO).

More stringent emission regulations have led to gas turbine combustion systems that utilize fuel-lean premixed combustion. Lean flames significantly reduces NOx emissions due to lower flame temperature, but are more sensitive to combustion acoustics, which may limit operability and performance, impact pollutant emissions, and reduce the useful life of combustor components. Typically, great effort is taken to optimize combustor design to meet both emissions and operability requirements.

At least some known gas turbine combustors include a plurality of mixers which mix high velocity air with liquid fuels, such as diesel fuel, or gaseous fuels, such as natural gas, to enhance flame stabilization and mixing. At least some known mixers include a single fuel injector located at a center of a swirler for swirling the incoming air. Both the fuel injector and mixer are located on a combustor dome. The combustor includes a mixer assembly and a heat shield that facilitates protecting the dome assembly. The heat shields and combustor liner are cooled by air impinging on the dome to facilitate maintaining operating temperature of the heat shields within predetermined limits.

During operation, the expansion of the mixture flow discharged from a pilot mixer may generate toroidal vortices around the heat shield. Unburned fuel may be convected into these unsteady vortices. After mixing with combustion gases, the fuel-air mixture ignites, and an ensuing heat release can be very sudden. In many known combustors, hot gases surrounding heat shields facilitate stabilizing flames created from the ignition. However, the pressure impulse created by the rapid heat release can influence the formation of subsequent vortices, and cause repetitive stress fatigue to combustor components. Subsequent vortices can lead to pressure oscillations within combustor that exceed acceptable limits, and cause repetitive stress fatigue to combustor components.

Combustion acoustics in gas turbine engines can occur over a range of frequencies. Typical frequencies are less than 1000 Hz. However under certain conditions high acoustic amplitudes for frequencies in the 1000~5000 Hz range are possible. These high-frequency acoustic modes can cause rapid failure of combustor hardware due to high cycle fatigue. The increase in energy release density and rapid mixing of reactants to minimize NOx emissions in advanced gas turbine combustors enhance the possibility of high frequency acoustics.

BRIEF DESCRIPTION OF THE INVENTION

In one aspect, an acoustic damper is provided. The acoustic damper comprises a first cavity and a second cavity. The first cavity has a hole for allowing fluid communication between the first cavity and a first fluid source. The second cavity has a first hole for allowing fluid communication between the first cavity and the second cavity. The second cavity has a second hole for allowing fluid communication between the second cavity and a second fluid source.

In a further aspect, a gas turbine engine is provided. The gas turbine engine includes a combustor and an acoustic damper. The acoustic damper comprises a first cavity and a second cavity. The first cavity has a hole for allowing fluid communication between the first cavity and a first fluid source. The second cavity has a first hole for allowing fluid communication between the first cavity and the second cavity. The second cavity has a second hole for allowing fluid communication between the second cavity and a second fluid source.

In an additional aspect, a method of making an acoustic damper for a gas turbine engine is provided. A first wall and a cylindrical body wall are formed in a combustion chamber liner of the gas turbine engine. An orifice plate is affixed within a cylinder defined by the cylindrical body wall. A second wall is affixed to the cylindrical body wall opposite the first wall.

DETAILED DESCRIPTION OF THE INVENTION

An acoustic damper abates high-frequency acoustics in dry-low emissions (DLE) combustors. The acoustic damper includes an orifice plate, placed inside of the damper, adding an additional degree of control to optimize dampener performance. By carefully selecting the orifice plate parameters (i.e., orifice plate thickness, orifice plate surface area, and the diameter and quantity of holes in the orifice plate), and the dimensions (i.e., volume, diameter, and height) of the cavities on the two sides of the orifice plate insert, one can have a more robust damper with much higher and broader absorption in comparison to a single chamber resonator.

Figure 1:
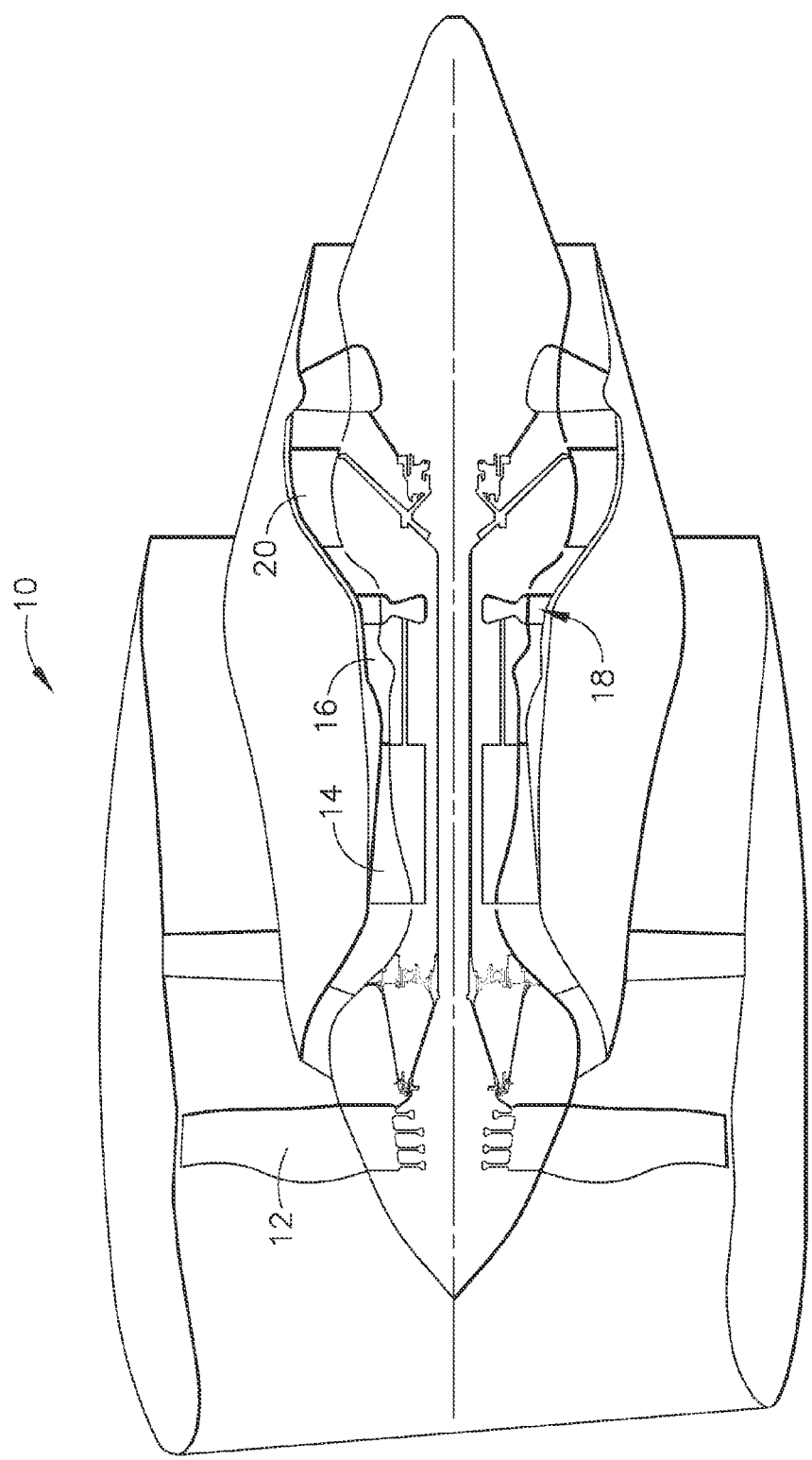
FIG. 1 is schematic illustration of a gas turbine engine including a combustor.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20.

In operation, air flows through low pressure compressor 12 and compressed air is supplied from low pressure compressor 12 to high pressure compressor 14. The highly compressed air is delivered to combustor 16. Airflow (not shown in FIG. 1) from combustor 16 drives turbines 18 and 20. In one embodiment, gas turbine engine 10 is a CFM engine. In another embodiment, gas turbine engine 10 is an LMS100 DLE engine available from General Electric Company, Cincinnati, Ohio.

Figure 2:
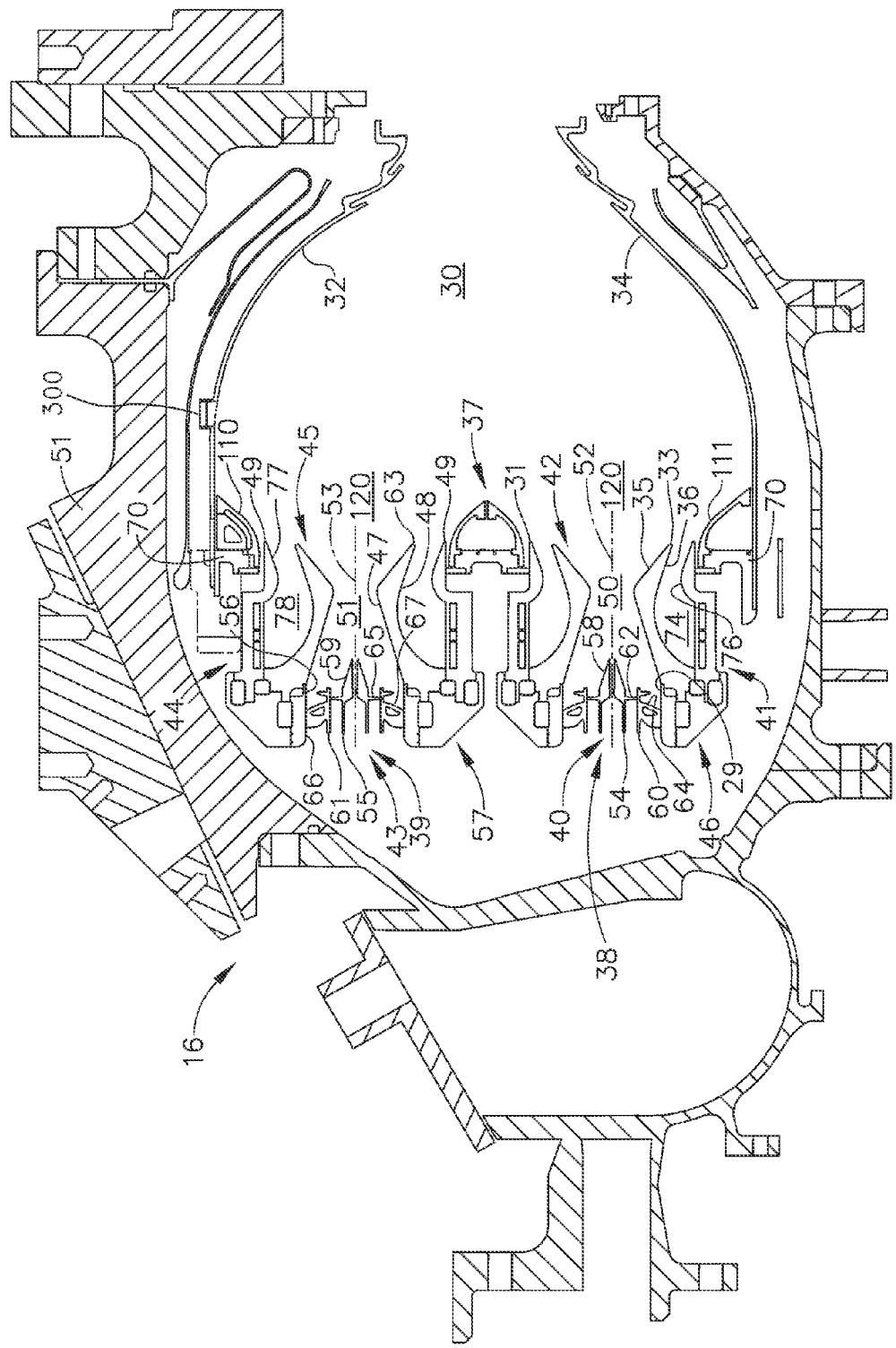
FIG. 2 is a cross-sectional view of a combustor that may be used with the gas turbine engine shown in FIG. 1.

FIG. 2 is a cross-sectional view of a combustor 16, shown in FIG. 1. Combustor 16 includes a combustion zone or chamber 30 defined by annular, radially outer and radially inner liners 32 and 34. More specifically, outer liner 32 defines an outer boundary of combustion chamber 30, and inner liner 34 defines an inner boundary of combustion chamber 30. Liners 32 and 34 are radially inward from an annular combustor casing 51, which extends circumferentially around liners 32 and 34.

Combustor 16 also includes a domeplate 37. Domeplate 37 is mounted upstream from combustion chamber 30 such that domeplate 37 defines an upstream end of combustion chamber 30. At least two mixer assemblies 38, 39 extend from domeplate 37 to deliver a mixture of fuel and air to combustion chamber 30. Combustor 16 includes a radially inner mixer assembly 38 and a radially outer mixer assembly 39. Combustor 16 is known as a dual annular combustor (DAC). Alternatively, combustor 16 may be a single annular combustor (SAC) or a triple annular combustor (TAC).

Generally, each mixer assembly 38, 39 includes a pilot mixer, a main mixer, and an annular centerbody extending therebetween. Inner mixer assembly 38 includes a pilot mixer 40, a main mixer 41 having a trailing edge 31, and an inner annular centerbody 42 extending between main mixer 41 and pilot mixer 40. Similarly, mixer assembly 39 includes a pilot mixer 43, a main mixer 44 having a trailing edge 49, and an annular centerbody 45 extending between main mixer 44 and pilot mixer 43.

Annular centerbody 42 includes a radially outer surface 35, a radially inner surface 36, a leading edge 29, and a trailing edge 33. Surface 35 defines a flow path for inner pilot mixer 40, and surface 36 defines a flow path for main mixer 41. A pilot centerbody 54 is substantially centered within pilot mixer 40 with respect to an axis of symmetry 52.

Similarly, annular centerbody 45 includes a radially outer surface 47, a radially inner surface 48, a leading edge 56, and a trailing edge 63. Surface 47 defines a flow path for outer pilot mixer 43, and surface 48 defines a flow path for main mixer 44. A pilot centerbody 55 is substantially centered within pilot mixer 43 with respect to an axis of symmetry 53.

Inner mixer 38 also includes a pair of concentrically mounted swirlers 60. Inner swirler 62 is annular and is circumferentially disposed around pilot centerbody 54, and outer swirler 64 is circumferentially disposed between pilot inner swirler 62 and a radially inner surface 35 of centerbody 42.

Main mixer 41 includes an outer throat surface 76, that in combination with centerbody radially outer surface 36, defines an annular premixer cavity 74. Centerbody 42 extends into combustion chamber 30. Main mixer 41 is concentrically aligned with respect to pilot mixer 40 and extends circumferentially around mixer 38.

Similarly, outer mixer 39 also includes a pair of concentrically mounted swirlers 61. Inner swirler 65 is annular and is circumferentially disposed around pilot centerbody 55, and outer swirler 67 is circumferentially disposed between pilot inner swirler 65 and radially inner surface 47 of centerbody 45.

Main mixer 44 includes an outer throat surface 77, that in combination with centerbody radially outer surface 48, defines an annular premixer cavity 78. A radially outer surface 77 within mixer 43 is arcuately formed and defines an outer flow path for main mixer 43. Main mixer 44 is concentrically aligned with respect to pilot mixer 43 and extends circumferentially around mixer 39.

In the one embodiment, combustor 16 also includes an outer heat shield 110 and an inner heat shield 111. Heat shields 110 and 111 are removably coupled downstream from domeplate 37 such that fluids discharged from premixer cavities 74 and 78 are directed downstream and radially inwardly along surfaces 114 of heat shields 110 and 111.

During assembly, heat shields 110 and 111 are coupled within combustor 16 to inner liners 32 and 34, respectively, such that mixer assembly 38 is substantially centered within inner heat shield 111, and mixer assembly 39 is substantially centered within outer heat shield 110. Heat shield 110 is positioned substantially circumferentially around at least one mixer assembly 39, and heat shield 111 is positioned substantially circumferentially around at least one mixer assembly 38.

During operation, pilot inner swirlers 62 and 65, pilot outer swirlers 64 and 67, and main swirlers 41 and 44 are designed to effectively mix fuel and air. Pilot inner swirlers 62 and 65, pilot outer swirlers 64 and 67, and main swirlers 41 and 44 impart angular momentum to a fuel-air mixture forming recirculation zones 120 downstream from each mixer assembly 38 and 39. After the fuel-air mixture flows from each mixer assembly 38 and 39, the mixture ignites and forms a flame front that is stabilized by recirculation zones 120. The local gas velocity at recirculation zones 120 is approximately equal to the turbulent flame speed. Heat shields 110 and 111 extend into combustion chamber 30 such that the unburned fuel-air mixture is adjacent heat shields 110 and 111. As such, the gas temperature adjacent heat shields 110 and 111 are approximately equal to the compressor discharge temperature rather than the adiabatic flame temperature. Moreover, because heat shields 110 and 111 extend arcuately into combustion chamber 30, heat shields 110 and 111 facilitate reducing a portion of the combustor volume that would normally be filled with a recirculating mixture of unburned reactants and hot products of combustion. Combustion chamber liner 32 includes acoustic damper 300.

Figure 3:
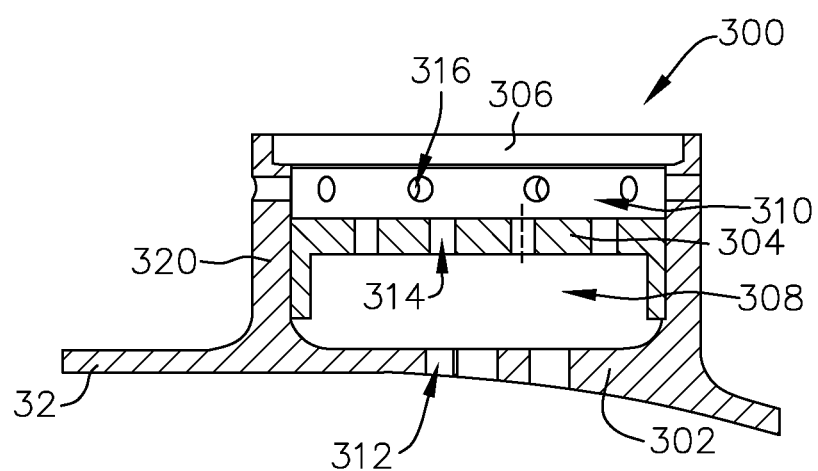
FIG. 3 is a side elevation cut-away of the acoustic damper shown in FIG. 2.

FIG. 3 shows a side elevation cut-away view of the acoustic damper 300. In one embodiment, acoustic damper 300 includes a cylindrical outer wall 320 integral with combustion chamber liner 32. A first wall 302 of the acoustic damper 300 includes a plurality of holes 312, each having the same diameter. In the embodiment illustrated in FIG. 3, the first wall 302 is integral with the combustion chamber liner 32. An orifice plate 304 is located within the volume defined by the cylindrical outer wall 320. The orifice plate 304 includes a plurality of holes 314, each having the same diameter. The office plate 304, the first wall 302, and the cylinder body 320 define a first cavity 308. The holes in the first wall 312 allow fluid communication between a first fluid source (e.g., the gases in combustor 30) and the first cavity 308. A second wall 306 is located opposite the first wall 302 and affixed to the cylindrical body wall 320. The second wall 306, the cylindrical body wall 320, and the orifice plate 304 define a second cavity 310. The holes 314 in the orifice plate 304 allow fluid communication between the first cavity 308 and the second cavity 310. In one embodiment, holes 316 allowing fluid communication between the second cavity 310 and a second fluid source (e.g., intake air or cooling air) are in the cylindrical body wall 320. It is also contemplated within the scope of the claims that the holes 316 allowing fluid communication between the second cavity and the second fluid source may be in the second wall 306. The plurality of holes 316 allowing fluid communication between the second cavity 310 and the second fluid source each have the same diameter.

In one embodiment, the acoustic damper 300 is constructed by forming the first wall 302 and the cylindrical body wall 320 in the combustion chamber liner 32, affixing the orifice plate 304 at a predetermined depth within the cylinder defined by the cylindrical body wall 320, and affixing the second wall 306 to the end of the cylindrical body wall 320 opposite the first wall 302. In another embodiment, the first wall 302, a portion of the cylindrical body wall 320, and the orifice plate 304 are all formed integrally with the combustion chamber liner 32, and another portion of the select vehicle body wall 320 is formed integrally with second wall 306 and affixed to the orifice plate 304 or cylindrical body wall 320.

The holes 316 act as metering orifices that control the amount of bias flow through the acoustic damper 300. The holes 314 in the orifice plate 304 and the holes 312 in the first wall 302 allow for the bias flow to diffuse into the hot combustion chamber 30 and also allow for the communication of acoustic waves originating in the combustion chamber 30 in and out of the acoustic damper 300. The volumes of each of the first and second cavities 308 and 310, and the size and quantity of the holes in the first wall 302, the orifice plate 304, and the second wall 306 are selected such that acoustic waves in a desired frequency range are absorbed in the acoustic damper 300. The location and number of acoustic dampers 300 to be used on a combustion chamber 30 should be determined experimentally or analytically based on acoustic model of the combustion chamber 30, with the understanding that there is a trade-off between number of acoustic dampers 300 and the amount of bias flow into the combustion chamber. In one embodiment, 2 dampers are used for each 24° combustor sector. The mitigation of combustion acoustics in the desired frequency range is achieved by absorption of acoustic waves by the cavity volume and shedding of vortices at the desired frequency by the effusion holes and hence converting acoustic energy to vortical energy. In one embodiment for use with an LMS100 DLE2 engine, the first wall 302 has 15 holes each 0.14 inches in diameter; the orifice plate 304 has 16 holes each 0.075 inches in diameter; the cylindrical body wall 320 has 5 holes each 0.08 inches in diameter; the first cavity 308 is 1.173 cubic inches; and the second cavity 310 is 1.224 cubic inches.

Acoustic waves in the desired frequency range are highly damped or completely eliminated. Combustion acoustics increase in amplitude when the driving force from the pressure/heat release coupling exceeds the system damping capacity. The acoustic damper 300 can eliminate the combustion acoustics by adding enough system damping to overcome the driving force. The acoustic damper 300 disclosed herein is suited for high frequency (KHz range) acoustics mitigation because the cavity volume is inversely proportional to the target frequency such that the higher that the target frequency is, the smaller the desired device volume. This eases implementation in a compact full annular combustor.

Figure 4:
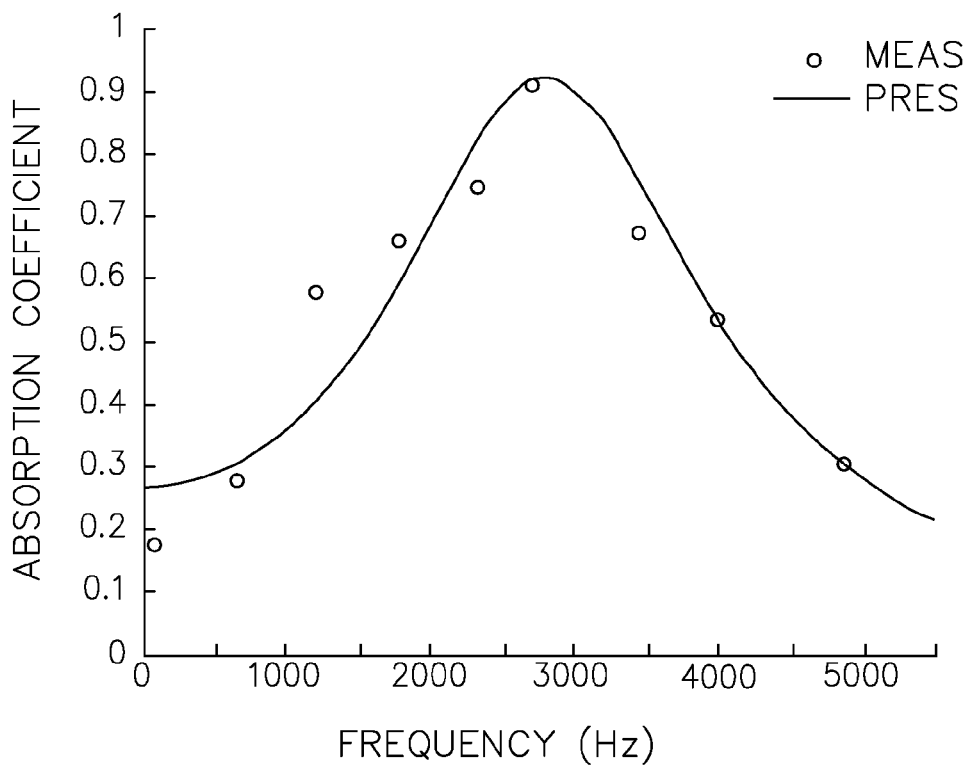
FIG. 4 is a graph showing the acoustic absorption coefficient of an acoustic damper known in the prior art.
Figure 5:
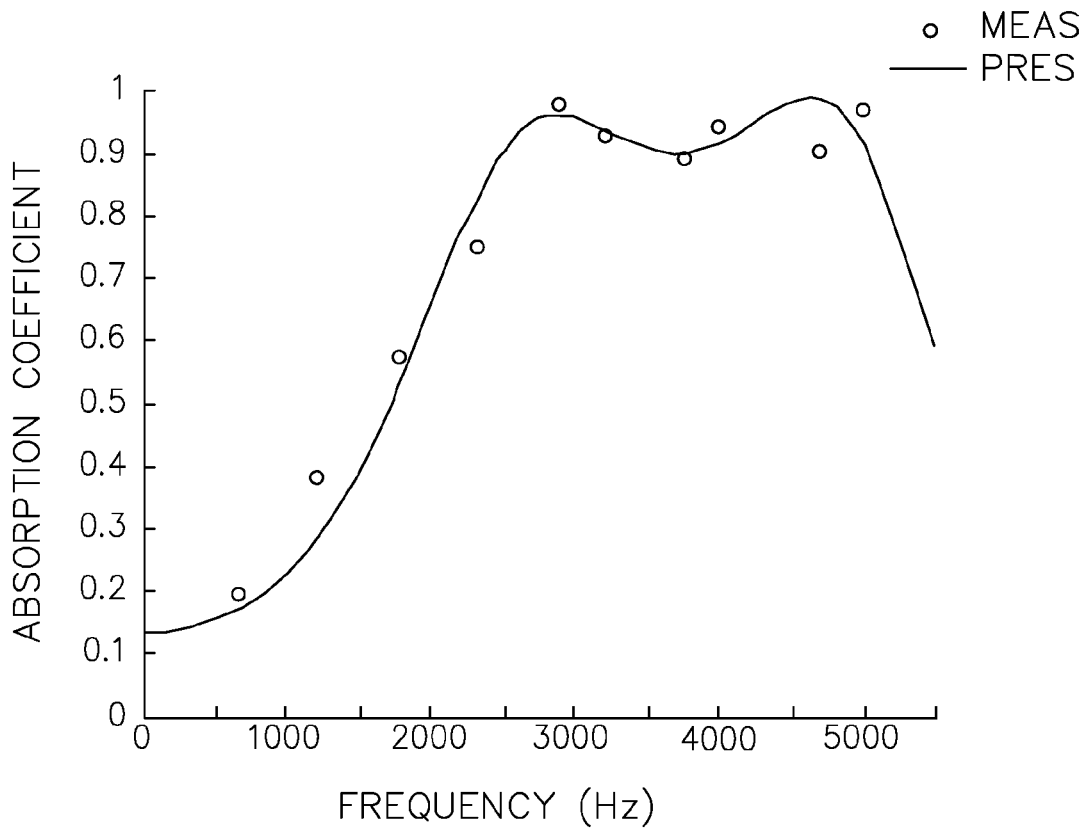
FIG. 5 is a graph showing the absorption coefficient of an acoustic damper as described herein.

Referring to FIGS. 4 and 5, the effectiveness of the acoustic damper 300 in a full annular combustor is shown relative to the effectiveness of a single chamber Helmholtz resonator in a full annular combustor. FIG. 4 plots the absorption coefficient of the single chamber Helmholtz resonator in the full annular combustor from 0-5500 Hz. The plot resembles a single bell curve centered at approximately 2750 Hz. FIG. 5 plots the absorption coefficient of the acoustic damper 300 in the full annular combustor from 0-5500 Hz. The plot resembles a pair of superimposed bell curves having different centering frequencies (i.e., 2500 Hz and 4750 Hz), however, the peak absorption coefficient has increased, and does not decrease significantly at frequencies between the 2 peaks. Additionally, the absorption coefficient in FIG. 5 remains relatively high across a broad range of frequencies, such that the area under the curve is greater than what could be achieved using multiple Helmholtz resonators having different target frequencies.

While the invention has been described in terms of various specific embodiments, those skilled in the art will recognize that the invention can be practiced with modification within the spirit and scope of the claims.

What is claimed is:

1. An acoustic damper comprising:
a sidewall circumscribing a damper volume; and
an orifice plate selectively positioned within the damper volume to form:
a first cavity in fluid communication with a first fluid source; and
a second cavity in fluid communication with the first cavity, the second cavity in fluid communication with a second fluid source.

2. The acoustic damper of claim 1, further comprising:
a first wall separating the first fluid source from the second fluid source, said first wall having a hole for allowing fluid communication between the first fluid source and the first cavity of the acoustic damper wherein said orifice plate separates the first cavity of the acoustic damper from the second cavity of the acoustic damper, said orifice plate having a hole that permits fluid communication between the first cavity of the acoustic damper and the second cavity of the acoustic damper; and
a second wall separating the second cavity of the acoustic damper from the second fluid source, said second wall having a hole that permits fluid communication between the second cavity of the acoustic damper and the second fluid source.

3. The acoustic damper of claim 2, wherein:
the first wall has a plurality of holes for allowing fluid communication between the first fluid source and the first cavity of the acoustic damper, each of said plurality of holes having the same dimensions;
the orifice plate has a plurality of holes for allowing fluid communication between the first cavity of the acoustic dampener and the second cavity of the acoustic dampener, each of said plurality of holes having the same dimensions; and
the second wall has a plurality of holes for allowing fluid communication between the second cavity and a second fluid source, each of said plurality of holes having the same dimensions.

4. The acoustic damper of claim 2, wherein each of a quantity of holes in the first wall, a quantity of holes and second wall, and a quantity of holes in the orifice plate are different.

5. The acoustic damper of claim 2, wherein quantity and dimensions of holes in the first wall, the orifice plate, and the second wall; a volume of the first cavity of the acoustic dampener; and a volume of the second cavity of the acoustic dampener are selected to create vortices for damping acoustic waves generated in the first fluid source.

6. The acoustic damper of claim 1, wherein the first fluid source is a combustion chamber of a gas turbine engine, and the first wall of the acoustic dampener is integral with a combustion chamber liner of the gas turbine engine.

7. The acoustic damper of claim 1, wherein the second fluid source is intake or cooling air of a gas turbine engine.

8. A gas turbine engine comprising:
a combustor; and
an acoustic damper affixed to a combustion chamber liner of the combustor, said acoustic damper comprising:
an orifice plate selectively positioned within the acoustic damper to form
a first cavity having a hole for allowing fluid communication between the first cavity and a first fluid source; and
a second cavity having:

a first hole for allowing fluid communication between the first cavity and the second cavity; and a second hole for allowing fluid communication between the second cavity and a second fluid source.

9. The gas turbine engine of claim 8, wherein the acoustic damper further comprises:

a first wall for separating a first fluid source from a second fluid source, said first wall having a hole for allowing fluid communication between the first fluid source and the first cavity of the acoustic dampener wherein said orifice plate for separating separates the first cavity of the acoustic damper from the second cavity of the acoustic damper, said second wall having a hole for allowing fluid communication between the first cavity of the acoustic damper in the second cavity of the acoustic damper; and a second wall for separating the second cavity of the acoustic damper from the second fluid source, said second wall having a hole for allowing fluid communication between the second cavity of the acoustic damper in the second fluid source.

10. The gas turbine engine of claim 9, wherein:

the first wall has a plurality of holes for allowing fluid communication between the first fluid source and the first cavity of the acoustic damper, each of said plurality of holes having the same dimensions;

the orifice plate has a plurality of holes for allowing fluid communication between the first cavity of the acoustic damper in the second cavity of the acoustic damper, each of said plurality of holes having the same dimensions; and the second wall has a plurality of holes for allowing fluid communication between the second cavity and a second fluid source, each of said plurality of holes having the same dimensions.

11. The gas turbine engine of claim 9, wherein each of a quantity of holes in the first wall, a quantity of holes and second wall, and a quantity of holes in the orifice plate are different.

12. The gas turbine engine of claim 9, wherein a quantity and dimensions of holes in the first wall, the orifice plate, and the second wall; a volume of the first cavity of the acoustic dampener; and a volume of the second cavity of the acoustic damper are selected to create vortices for damping acoustic waves generated in the first fluid source.

13. The gas turbine engine of claim 9, wherein the first fluid source is a combustion chamber of a gas turbine engine, and the first wall of the acoustic damper is integral with a combustion chamber liner of the gas turbine engine.

14. The gas turbine engine of claim 9, wherein the second fluid source is intake or cooling air of a gas turbine engine.

15. A method of making an acoustic damper for a gas turbine engine, said method comprising:

forming a first wall and a cylindrical body wall in a combustion chamber liner of the gas turbine engine;

affixing an orifice plate within a cylinder defined by the cylindrical body wall; and affixing a second wall to the cylindrical body wall opposite the first wall.

16. The method of claim 15, wherein the orifice plate is affixed to the cylindrical body wall at a predetermined depth within the cylinder defined about the cylindrical body wall.

17. The method of claim 15, further comprising providing a predetermined quantity of holes in the first wall, said holes each having the same predetermined diameter.

18. The method of claim 15, further comprising providing a predetermined quantity of holes in the orifice plate, said holes each having the same predetermined diameter.

19. The method of claim 15, further comprising providing a predetermined quantity of holes in the cylindrical body wall, said holes each having the same predetermined diameter, wherein said holes are located between the orifice plate in the second wall.

20. The method of claim 15, further comprising providing a predetermined quantity of holes in the second wall, said holes each having the same predetermined diameter.

* * * * *